United States Patent [19]

Duclos

[11] Patent Number: 5,673,598
[45] Date of Patent: Oct. 7, 1997

[54] DAMPED FLYWHEEL, ESPECIALLY FOR A MOTOR VEHICLE, WHEREIN A FRICTION MEANS IS MOUNTED IN A CAVITY BOUNDED BY THE REACTION PLATE AND THE DAMPER PLATE

[75] Inventor: Didier Duclos, Ozoir la Ferriere, France

[73] Assignee: Valeo, Paris Cedex, France

[21] Appl. No.: 481,381

[22] PCT Filed: Nov. 15, 1994

[86] PCT No.: PCT/FR94/01332

§ 371 Date: Jul. 13, 1995

§ 102(e) Date: Jul. 13, 1995

[87] PCT Pub. No.: WO95/14180

PCT Pub. Date: May 28, 1995

[30] Foreign Application Priority Data

Nov. 15, 1993 [FR] France ................. 93 13581

[51] Int. Cl.⁶ .................. F16F 15/123; F16D 3/14
[52] U.S. Cl. ........................... 74/574; 192/70.17
[58] Field of Search ............... 74/574; 192/213.31, 192/214.1, 70.17; 464/68

[56] References Cited

U.S. PATENT DOCUMENTS

| | | |
|---|---|---|
| 4,274,524 | 6/1981 | Nakane ............... 192/70.17 |
| 4,782,933 | 11/1988 | Jackel et al. . |
| 4,850,932 | 7/1989 | Kagiyama et al. ........ 192/213.31 X |
| 4,932,921 | 6/1990 | Kobayashi et al. ........... 74/574 X |
| 4,950,205 | 8/1990 | Umeyama .................. 464/68 |
| 5,111,714 | 5/1992 | Honoki et al. . |
| 5,176,233 | 1/1993 | Woerner et al. ........... 74/574 X |
| 5,229,198 | 7/1993 | Schroeder . |

FOREIGN PATENT DOCUMENTS

| | | |
|---|---|---|
| 0 060 725 | 9/1982 | European Pat. Off. . |
| 0395198 | 10/1990 | European Pat. Off. . |
| 0509875 | 10/1992 | European Pat. Off. . |
| 2675517 | 10/1992 | France . |
| 2-158690 | 6/1990 | Japan . |
| 2168784 | 6/1986 | United Kingdom . |

*Primary Examiner*—Charles A. Marmor
*Assistant Examiner*—Mary Ann Battista
*Attorney, Agent, or Firm*—Longacre & White

[57] ABSTRACT

The torsion damper comprises two coaxial masses (1, 2) which are mounted for rotation of one with respect to the other against a torsion damper device (3), which comprises friction member (5) and a damper plate (31) fixed to a reaction plate (21) which is part of one of the masses. The other mass includes a central nose (4) which projects axially and penetrates into central bores of the damper plate (31) and reaction plate (21). A plain bearing is interposed between the said central bores and the central nose (4), while the friction member (5) is mounted in a cavity, the greater part of which is bounded by the damper plate (31) and the reaction plate (21).

8 Claims, 3 Drawing Sheets

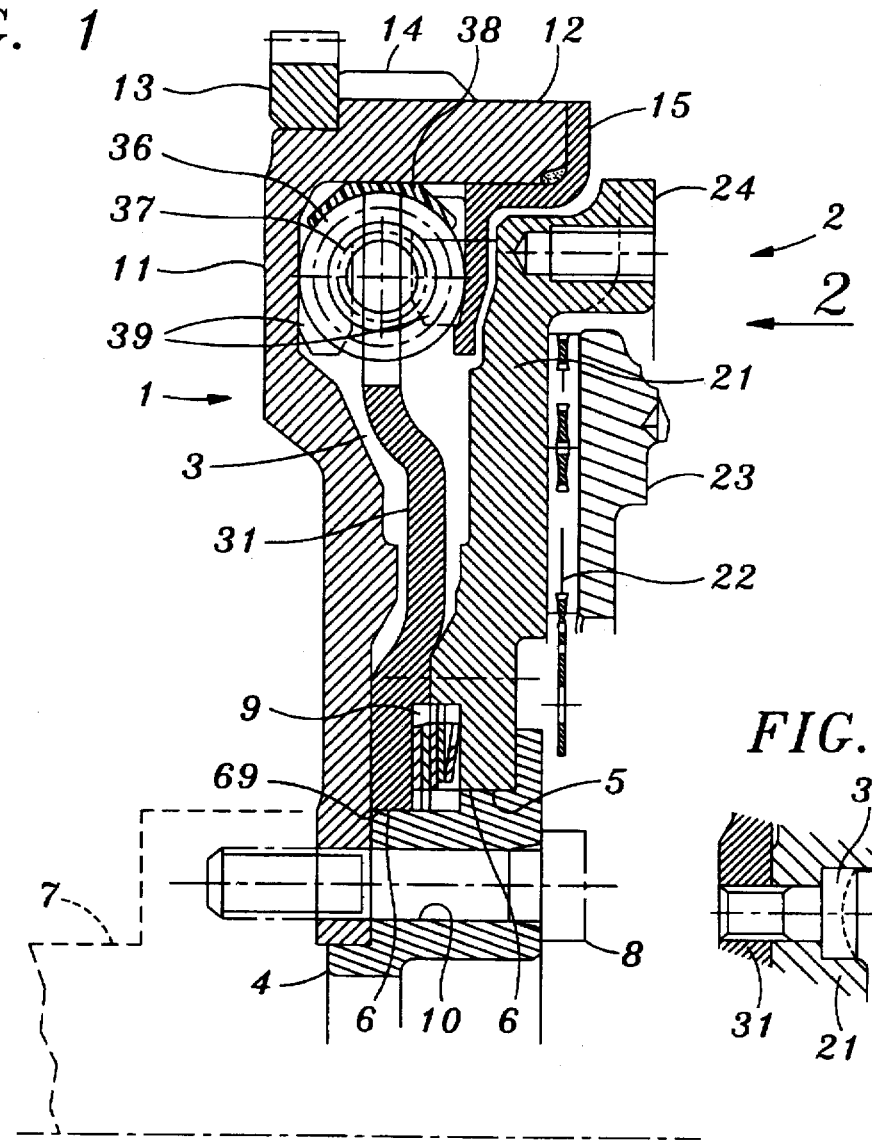
FIG. 1
FIG. 3
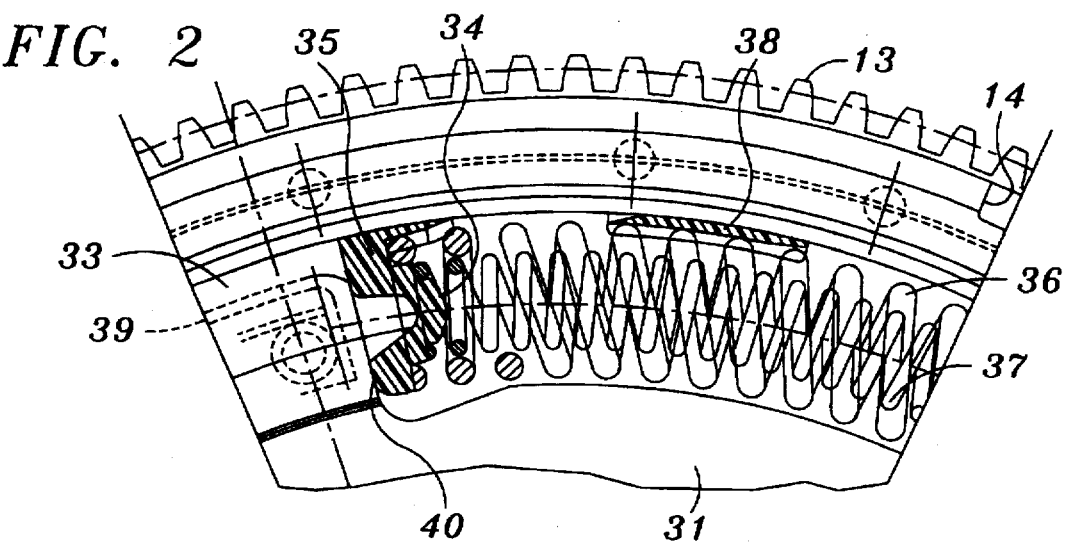
FIG. 2

DAMPED FLYWHEEL, ESPECIALLY FOR A MOTOR VEHICLE, WHEREIN A FRICTION MEANS IS MOUNTED IN A CAVITY BOUNDED BY THE REACTION PLATE AND THE DAMPER PLATE

BACKGROUND OF THE INVENTION

1. Field of the Invention

The present invention relates to damped flywheels, especially for motor vehicles, of the kind consisting generally of two coaxial masses which are mounted for rotation of one with respect to the other against a torsion damper device which includes a friction means, with one of the masses including a central nose projecting axially and penetrating into a central aperture of the other mass, and with support means being interposed between the said nose and the said aperture for the rotary mounting of the mass having the central aperture.

2. Description of Related Art

Such a damped flywheel is described in the document U.S. Pat. No. 4,782,933.

The support means conventionally consist of a ball bearing, which increases the selling price of the damped flywheel.

In addition, this bearing is usually lubricated so that the grease which it contains is able to escape and thus make the reaction plate and/or the friction means dirty, so that the performance and useful life of the damped flywheel are reduced.

Besides this, the rolling bearing can seize up. In the said document U.S. Pat. No. 4,782,993, the rolling bearing is associated with the above mentioned friction means.

More precisely, the friction means is carried by the central nose and is interposed axially between the inner ring of the rolling bearing and a plate of a first mass.

The friction means comprises, in the manner known per se, an axially acting resilient ring which bears on a thrust ring mounted on the central nose for rotation with the latter, and on a shoulder carried by the central nose, so as to clamp a friction ring, which carries friction liners on each of its faces, so producing frictional contact.

The said friction ring meshes with bars which are secured to the second mass.

Thus the friction ring is caused to rub against the plate and the thrust ring when the damped flywheel is working.

The said bars secure a damper plate, which is part of the torsion damper device, to a plate of the second mass, in such a way that these latter are subjected to biasing action by the friction means. Another result is that the arrangement consisting of the rolling bearing and friction means has a large axial size.

SUMMARY OF THE INVENTION

An object of the present invention is to overcome these drawbacks in a simple and inexpensive way, and accordingly to provide a novel damped flywheel which does not have a ball bearing, while also being more compact in the region of its central nose.

In accordance with the invention, a damped flywheel of the type described above, in which the torsion damper device includes a damper plate, is characterised in that the friction means is mounted in a cavity which is bounded by a plate of the second mass and by the damper plate, and in that the support means are of the plain bearing type and are interposed between the central nose and the central bores of the said plate and of the said damper plate.

Thanks to the invention, the selling price of the damped flywheel is reduced, and the axial size of the latter is reduced in the region of its central nose.

In addition, due to the cost-saving omission of the rolling bearing, it is possible to mount the friction means within the cavity in accordance with the invention.

It will also be appreciated that the length of the damper plate and of the said plate of the second mass are increased, because in practice the size of the support means is reduced in the radial direction, which enables the evacuation of heat to be improved, and therefore enables the plain bearing, in two parts according to the invention, to be conserved.

In addition, the second mass is mounted so as to turn on the first mass in a balanced manner, because the said plate of the second mass, and the damper plate, are supported.

In addition, the manufacture of the damped flywheel is simplified because it is possible to fit the friction means into the second mass.

Furthermore, it is possible to keep ready in advance the friction means which, after being fitted, is well protected and is sheltered from any dirt.

Preferably, the central nose is carried on the first mass, which enables the support means, comprising a plain bearing in accordance with the invention, to be fitted in advance on the latter.

According to a feature of the invention, a damped flywheel of the type described above is characterised in that the support means include a coating of amorphous diamond carbon, for the rotary mounting of the mass having the central aperture on the mass having the central nose.

Such a coating is also referred to in the literature as "pseudo diamond carbon", the said coating being approximately amorphous and containing carbon with a small proportion of hydrogen.

For more detail, reference should be made to the documents FR-A-2 675 517 and EP-A-0 395 198, which describe a method with introduction, using valves, of a carbonated gas into a chamber which has previously been evacuated using a pump.

After this introduction, an electric discharge is effected using a high frequency generator which leads to ionisation of the carbonated mass, so that the atoms partially lose their electrons so as to form a plasma. The metallic support, contained in the above mentioned chamber and serving to support the component to be coated (the central nose and/or the damper plate for example), then becomes negatively charged so as to attract the positive ions present in the plasma, which causes the coating of amorphous diamond carbon to be formed.

With this arrangement, the coating gives exceptional properties to the damped flywheel, close to those of synthetic diamond.

Thus, the flywheel has support means which are highly abrasion resistant and have a low coefficient of friction, which in practice is smaller than that of a polytetrafluorethylene coating sold, for example, under the Trade Mark "Teflon", or of MoS2(molybdenum bisulphide), a thermal conductivity which is greater than that of copper, and high corrosion resistance.

In addition, this coating is stable at the temperatures which can be reached by the damped flywheel.

Besides this, its thickness is small, being of the order of 2 to 3 microns, so that it has little effect on the dimensions of the treated components.

This low thickness enables the above mentioned plate to be further lengthened, so that evacuation of heat is improved.

In general terms, this coating is inexpensive, and in particular it enables the selling price of the damped flywheel to be reduced, while increasing the working life of the latter and its reliability. The reaction plate and/or the friction means cannot become dirty, because the coating is of the dry type.

As is described in the document FR-A-2 675 517, this coating can of course be obtained, by plasma-assisted chemical vapour condensation as above, from carbonated gases which for example contain one or more hydrocarbons such as methane, acetylene, propane or butane, to which silicone compounds and/or nitrogen-boron compounds are added, with the silicon giving flexibility and adhesive qualities while the nitrogen and the boron give thermal stability with an increase in hardness.

It will be appreciated that this coating adheres perfectly to the component concerned, and that it has hardly any tendency to peel off.

In addition, this coating is an excellent electric insulator.

In a modification, it is possible to use as the plain bearing a polyetheretherketone sold under the Trade Mark "ARLON". This bearing, which consists of a semicrystalline, hard thermoplastic material, is resistant to high temperatures and enables it to be used at temperatures greater than 260 degrees, so that it is well adapted for the damped flywheel, in which the temperature may reach values of 200 degrees in the region of its central nose.

In addition, this material is highly resistant to abrasion and can accept high loads. The said material is preferably reinforced with fibres, such as glass fibres or carbon fibres.

Lubricating fillers are preferably added to this material.

In a modification, it is possible to use, for the plain bearing, a copolymer of ethylene and tetrafluorethylene such as "Teflon".

BRIEF DESCRIPTION OF THE DRAWINGS

The following description illustrates the invention with reference to the attached drawings, in which:

FIG. 1 is a half view in axial cross section of a damped flywheel in accordance with the invention;

FIG. 2 is a partial view in the direction of the arrow 2 in FIG. 1, with the second mass and the sheet metal component masking the springs omitted;

FIG. 3 is a scrao view in axial cross section, showing a stud fastening the plate of the first mass to the reaction plate of the second mass;

DETAILED DESCRIPTION OF PREFERRED EMBODIMENTS

Figure 4:
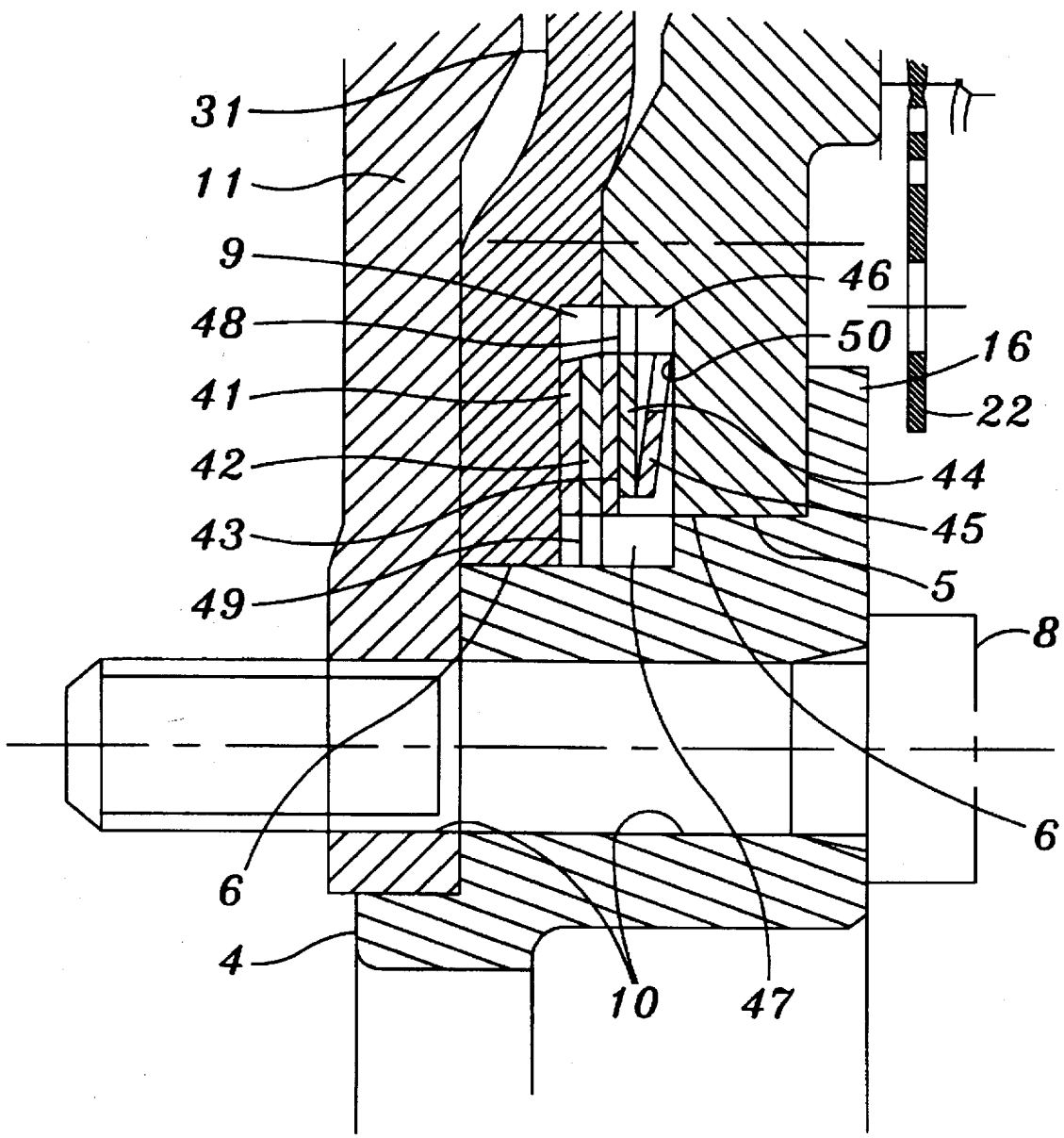
FIG. 4 is a partial view showing the friction device of FIG. 1 on a larger scale.

The drawings show a damped flywheel, commonly referred to as a double damped flywheel, for a motor vehicle, being of the kind that generally comprises two coaxial masses 1, 2 mounted for rotation of one with respect to the other against a torsion damper device 3, with one of the masses including a central nose 4 which projects axially and which penetrates into a central aperture (or bore) 5 of the other mass, with support means 6 being interposed between the said nose 4 and the said aperture 5, for rotatable mounting of the mass having the central aperture 5.

In the known way, the damped flywheel absorbs vibrations which arise along the whole length of the drive train in a motor vehicle, extending from the internal combustion engine to the road wheels.

More precisely, in this example the first mass 1, or input mass, is arranged to be mounted in rotation on the crankshaft 7 of the engine, while the second mass 2, or output mass, is arranged to be mounted in rotation on the input shaft of the gearbox.

The first mass 1 therefore receives the engine torque, while the second mass 2 transmits the torque of the input shaft of the gearbox.

In this example (FIG. 1) it is the first mass 1 that has the central nose 4, while the second mass 2 has the central aperture 5.

The mass 1 is fixed to the crankshaft 7 by means of a plurality of threaded studs 8, each of which extends through holes 10 formed in line with each other in the nose 4 and in a transverse plate 11, respectively. The said nose 4 centres the plate 11, and the studs 8 assemble the plate 11 and the nose 4 together.

The plate 11 carries at its outer periphery an axially orientated spacing crown 12, which in this example is integral with the plate 11. In a modification, the crown 12 is a separate component, secured on the plate 11 by, for example, riveting or seaming.

The crown 12 carries a starter crown 13 which is adapted to be driven by the starter of the vehicle, together with ignition markers 14 in the form of recesses (FIG. 2) or bosses (not shown).

A sheet metal member 15, having a crooked profile, matches the profile of the crown 12 and is fitted to the free end of the latter. The member 15 is secured to the crown 12 by welding, and has at its inner periphery a portion in the form of a transverse plate element directed towards the axis of the assembly.

The second mass 2 includes a plate 21 that constitutes the reaction plate of a conventional clutch, of which the friction disc, having friction liners, can be seen in part at 22, and its pressure plate at 23. It is on the peripheral flange 24 of the plate 21 that the cover plate of the clutch (not shown) is fixed, with a diaphragm (not shown) interposed between the cover plate and the pressure plate.

For more more detail, reference should be made for example to FIG. 1 of the document U.S. Pat. No. 4,782 933, bearing in mind that normally the clutch is engaged, with the disc 22 being clamped under the action of the diaphragm between the plates 21, 23.

The disc 22 has, at its inner periphery (not shown), a hub which is mounted for rotation on the input shaft of the gearbox, and the second mass is thus mounted for rotation, through the clutch, on the said input shaft.

The plate 21 has at its inner periphery a bore that constitutes the above mentioned central aperture 5.

A damper plate 31 is secured by means of screws 32 (FIG. 3) on the reaction plate 21 at the inner periphery of the latter, radially inwardly of the friction liners of the disc 21.

The damper plate 31 has at its inner periphery a central aperture or bore 69, and at its outer periphery a plurality of projecting radial arms 33, one of which can be seen in FIG. 2.

This damper plate 31 is arranged to make contact with the reaction plate 21 at its inner periphery in a manner to be described below.

Each arm 33 has circumferential fingers 40, each of which penetrates into a recess in a thrust insert cup 35 (FIG. 2). Concentric coil springs 36, 37 are interposed between two consecutive arms 33, with insert cups 35 between the circumferential ends of the springs 36, 37 and the arms 33.

The insert cup 35 is configured so as to provide external retention for the outer spring 36, and has a central projecting portion 34, which defines the above mentioned recess, for centering the inner spring 37.

The arms 33 penetrate into the cavity defined by the member 15, the crown 12 and the plate 11.

The plate 11 and the member 15 carry, riveted to them, blocks 39 which are in facing relationship with the arms 33, for engagement of the springs 36, 37 which act circumferentially via the insert cups 35. Thus, the springs 36, 37 can be greased, grease being provided in the above mentioned cavity.

In place of blocks, the member 15 and the plate 11 may of course have press-formed portions for engagement by the springs 36, 37. It will be noted that the outer springs 36 carry pads 38 which are mounted on one turn of the spring 36, the said pads being in frictional engagement against the inner periphery of the crown 12. The said springs 36, 37 work in opposition to the rotation of the masses 1, 2 with respect to each other.

The components 31, 33, 35, 36, 37, 38, 39 are part of the torsion damper device 3 mentioned above, which is interposed mechanically between the two masses. Thus, in a manner known per se, the springs 36, 37 are compressed during the relative angular displacement between the two masses 1, 2. The torsion damper device 3 also includes a friction means 9 arranged at the outer periphery of the nose 4, which in this example is of metal and of tubular form.

The reaction plate 21, which is conventionally a casting, becomes heated. In this connection, each time the clutch is engaged, the friction liners of the disc 21 rub on the plate 21, which can, as a result, reach temperatures of the order of 200 degrees in the region of the support means 6.

In this connection, and in order that the ball bearing, which is usually interposed between the two masses of the damped flywheel, can be omitted with a view to reducing the cost of the damped flywheel, at the same time reducing the axial size of the damped flywheel in the region of its central nose 4, the invention proposes to mount the greater part of the friction means 9 within a cavity which is delimited by the reaction plate 21 of the second mass 2 and the damper plate 31.

The invention proposes to employ as the support means a plain bearing, with the said plain bearing being interposed between the central nose 4 and the said plate 21 and the said damper plate 31.

More precisely, this plain bearing 6 is interposed between the outer periphery of the central nose 4 and the central bores or apertures 69, 5 of the damper plate 31 and plate 21. It extends on either side of the cavity 50.

In FIG. 1, the support means are characterised in that they include a coating of amorphous diamond carbon for the sub-rotary mounting of the damper plate 31 and reaction plate 21 on the mass having the central nose 4.

This coating, in the form of a layer, is easy to apply.

More precisely, the friction means 9 is mounted in a cavity 50 which is defined by recesses formed, in facing relationship to each other, in the damper plate 31 and in the reaction plate 21, respectively (FIG. 4).

The friction means comprises, in axial succession going from the damper plate 31 to the plate 21, a friction ring 41, a motion transmitting ring 42, a friction ring 43, a ring 44, and an axially acting resilient ring 45 which in this example is of the Belleville ring type.

The friction rings 41, 43 may be fixed to the ring 42, for example by adhesive bonding. In a modification, the ring 41 may be adhesively bonded on the damper plate 31, and the ring 43 on the ring 44.

The said rings 41, 43 may be mounted free. All of this depends on the particular applications and on the frictional effects desired. In this example, the ring 44 acts as a thrust ring for the resilient ring 45.

The ring 42 has at its inner periphery a plurality of teeth 49, while the ring 44 has at its outer periphery a plurality of teeth 48. The teeth 49 and 48 penetrate into grooves 47 and 46 which are formed in the outer periphery of the nose 4, and in the plate 21 at the outer periphery of the cavity 50, respectively.

In this way a mating coupling, which in this example is of the tenon and mortice type, is formed.

The said teeth 49 and 48 mesh with the associated groove 47, 46, in this example without a clearance.

In a modification, at least one of the said teeth 49, 48 may mesh with its associated groove 47, 46 with a clearance.

All this depends on the application, and the friction means may act permanently or, for example, during starting or stopping of the engine.

It will be recalled that in operation, the second mass 2 is caused to be displaced circumferentially with respect to the first mass 1, in such a way that the thrust ring 44 is driven in rotation by the second mass 2, and the ring 42 is driven in rotation by the first mass 1.

Thus, here, friction occurs between the friction ring 41 and the damper plate 31, and between the friction ring 43 and the thrust ring 44, with the spring 45, which in a modification may be a corrugated resilient ring, being mounted between two parts which are coupled for rotation of one with respect to the other, in such a way that wear is reduced.

In this example, the nose 4 is shouldered at one of its ends, which is here its free end (that which is furthest away from the plate 11), and for this purpose it has a collar portion 16.

The nose 4, which is cylindrical, is stepped at its outer periphery and has, defined by changes in diameter, going from the plate 11 to the collar portion 16, a smooth first portion, a second portion having the grooves 47 and being of larger external diameter, and a smooth third portion which is bounded by the collar portion 16 and which is of generally the same diameter as the second portion.

As will have been understood, it is easy to form the grooves 47.

Similarly, the grooves 46 are readily made, by being formed in the axially orientated outer portion of the recess in the plate 21 that defines the cavity 50.

The nose 4 in this example is secured on the plate 11 by means of the studs 8, so that it is easy to build a sub-assembly comprising the damper plate 31, the friction means 9 mounted in its cavity 50, and the plate 21.

In this connection it is sufficient to stack the rings 45 and 44 into the recess in the plate 21, then to fit the rings 41 to 43, and finally to fit the damper plate 31, which then comes into contact with the inner periphery of the reaction plate 21 so as to close the cavity, the fastening between the components 31, 21 being obtained by means of the screws 32 in FIG. 3.

As a result, the teeth 49 project radially inwardly. It is then sufficient finally to fit the nose 4 into the central bores of the damper plate 31 and the plate 21, with the grooves 47 coming into engagement with the teeth 49.

Preferably, the amorphous diamond coating is formed on the outer periphery of the nose 4, and also extends on to the face of the collar portion 16 which is directed towards the plate 11.

More precisely, a deposit of a hard layer of amorphous diamond carbon is obtained preferably by the technique or method known as "plasma assisted CVD". In this technique, a carbonated gas, containing one or more hydrocarbons, is introduced into a vacuum chamber which encloses a metallic support connected to a high frequency generator, and on which the metallic component to be coated is placed, and an electric discharge is effected inside the chamber so as to raise the temperature of the said component to a value of the order of 200° C., under conditions of power and pressure which cause the gas to be excited physically and chemically and to be ionised, whereby to cause a hard layer of amorphous diamond carbon or pseudo diamond carbon, of low thickness (2 to 3 microns), to be deposited on the component, which is accordingly negatively charged.

Silicon compounds, especially silane and/or tetramethylsilane, and also compounds containing an atom of carbon, or boron, or fluorocarbon, are preferably added to the carbonated gas.

The nitrogen and boron give thermal stability as well as hardness, and a thin layer of a particular hard and dense material is deposited.

The thickness of this layer may of course be greater than 2 or 3 microns, according to the application.

As will have been understood, the treatment of the nose 4 reduces the unit cost of the process, because it is possible to treat a plurality of components all at once.

It will be noted that it is possible, to advantage, also to treat in the same way the surface of the plate 11 which faces towards the collar portion 16. In a modification, the surface of the damper plate 31 adjacent to the plate 11, and the central bore 39 of the damper plate 31, may be treated.

It will be appreciated that the coating also extends into the grooves 47, which is not detrimental having regard to the low thickness of the deposit.

The plain bearing can of course be of a hard, semicrystalline thermoplastic material such as "Arlon" mentioned above. It may also be based on "Teflon".

Figure 6:
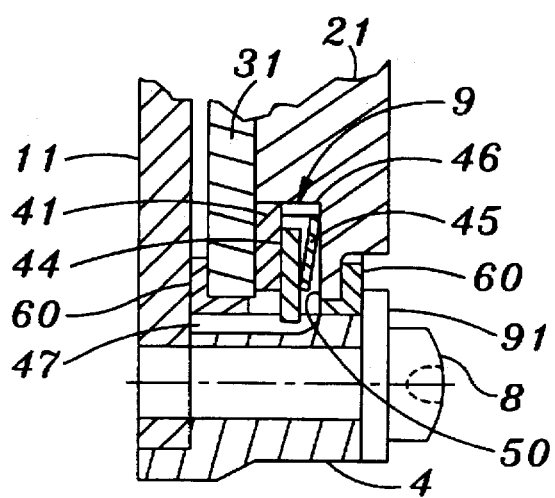
FIG. 6 is a view similar to FIG. 4 for yet another embodiment.

In that case, it is necessary to provide two shouldered half rings 60 having a cross section in the form of an inverted L (FIG. 6).

It will be appreciated that the second mass is thus well supported by the nose 4.

All of these arrangements lead to the extension, towards the axis of the assembly, of the damper plate 31 and plate 21, but this is not detrimental because it enables heat to be evacuated more effectively, and therefore enables the plain bearing, in two parts according to the invention, to be more effectively protected.

It will be appreciated that no undue biassing action is exerted on the screws 32 by the friction means 9, which is in no danger of becoming dirty because it is finally fitted into a closed cavity bounded by the nose 4 (the grooves 47), the plate 21 and the damper plate 31. The said means is thus well protected.

In addition, given the absence of a lubricated rolling bearing, there is no risk of the pressure plate 21 becoming dirty. In addition, there is no risk of the grease from the springs 36 and 37 adversely affecting the operation of the friction means 9 according to the invention.

It will be noted here that the damper plate 31 has a crooked profile, with a central portion being offset axially towards the plate 21. The same is true for the plate 11.

These crooked profiles enable the size of the damped flywheel to be reduced, and the available space to be made use of in the best possible way.

It will be appreciated that the formation of the subassembly consisting of the damper plate 31, plate 21 and friction means 9 enables the friction means 9 to be easily stored before being finally fitted on the vehicle.

The present invention is of course not limited to the embodiment described. In particular, the damper device may be of the same type as that described in the document U.S. Pat. No. 4,782,933, so that the damper plate 31 constitutes one guide ring of a torsion damper which is mounted in series with a torque limiter.

In that case it is the spacing bars that secure the damper plate to the pressure plate.

It can thus be seen that in this way, by virtue of the invention, the space available in the region of the central nose 4 is filled.

Figure 5:
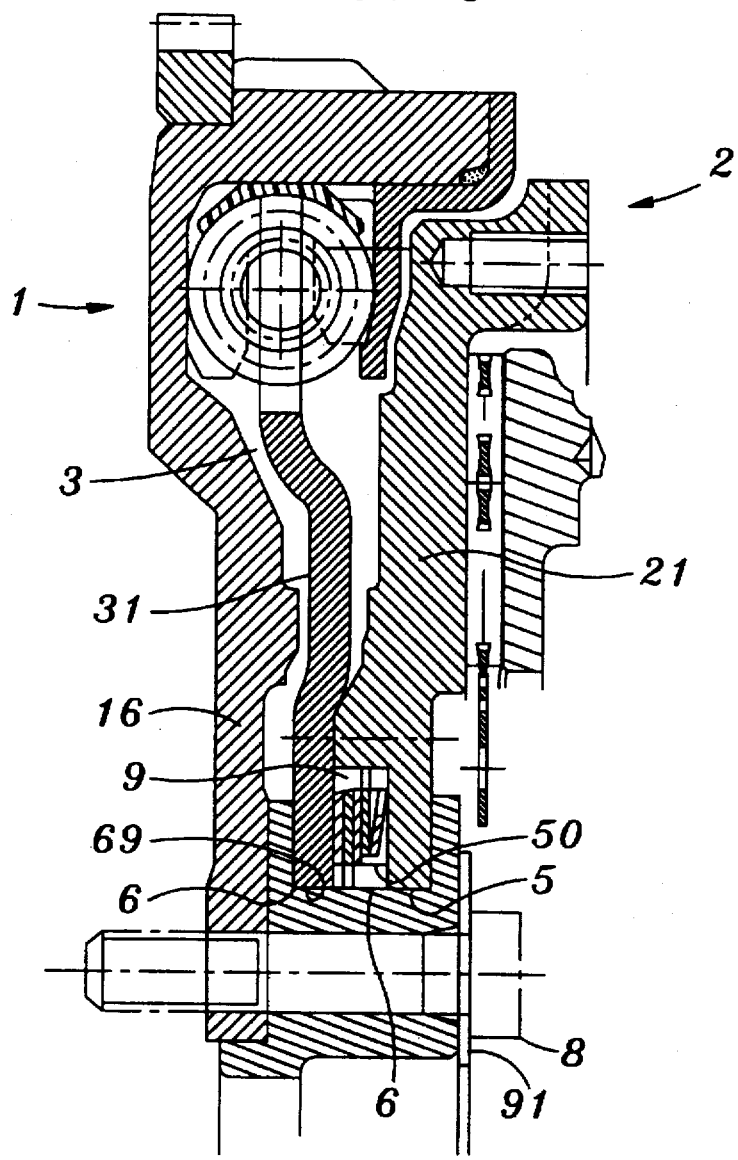
FIG. 5 is a view similar to FIG. 1 for another embodiment.

It is of course possible to reverse the structures as can be seen in FIG. 5, with the collar portion 16 of the nose 4 then being adjacent to the plate 11.

In this case it is necessary to provide a ring 91 for securing the plate 21 axially. Preferably, this ring should be treated as in the embodiment of FIGS. 1 to 4, so that the latter is coated with a layer of amorphous diamond carbon.

It will be noted that in this Figure, the plate 11 is not dished.

In a modification of FIG. 5, the nose 4 can of course be integral with the plate 11.

It will be noted that it is possible to decrease or increase the number of rings present in the cavity. Thus in FIG. 6, the friction means has only one friction ring 42, one thrust ring 44, and one resilient ring 45.

The resilient ring 45 is here coupled in rotation to the reaction plate 21, while the thrust ring 44 is coupled in rotation to the nose 4, and the ring 41 is fixed by adhesive bonding, either to the damper plate 31 or to the ring 44.

It will be noted that the resilient ring 45 is, as in FIG. 1, a ring of the Belleville type extended at its inner periphery by means of lugs, which mesh with the associated grooves 46 in the reaction plate 21.

It is of course possible to reverse the structures, as regards the driving of the rings 44 and 42 in rotation. In that case, the rings 42, 44 carry the mortices and the nose 4 and the plate 21 the tenons, these being in the form of axially orientated slots and teeth respectively.

In every case, the rings 42, 44 mesh, optionally with a clearance, with the assembly consisting of the damper plate 31 and flywheel 21, and with the nose 4, respectively.

It is possible to combine the arrangements of FIGS. 4 and 6, with the half ring 60, which is for example of "Arlon", replacing for example the coating in the region of the collar portion 16 and the portion of the nose 4 having the largest diameter.

I claim:

1. A damped flywheel comprising first and second coaxial masses (1, 2) which are mounted for rotation of one with respect to the other against a torsion damper device (3)

which includes a friction means (9) with the first mass including a central nose (4) projecting axially and penetrating into a central aperture (5) of the second mass, with support means (6) being interposed between said nose and said central aperture for the rotary mounting of the second mass, wherein the torsion damper device (3) comprises a damper plate (31) which is in contact at its inner periphery with a reaction plate (21) of the second mass (2), each of said damper plate (31) and said reaction plate (21) having a central bore (69, 5) forming the central aperture characterized in that the friction means (9) is mounted in a cavity (50), the greater part of which is bounded by a recess of the reaction plate (21) and by the damper plate (31) which is fixed at its inner periphery on the reaction plate (21), and in that the support means (6, 60) are bearing members and are interposed between the central nose (4) and the central aperture.

2. A damped flywheel according to claim 1, characterized in that the support means (6) having a coating of amphorous diamond carbon for rotary mounting of the damper plate (31), and of the reaction plate (21) of the second mass, on the central nose (4) of the first mass (1).

3. A damped flywheel according to claim 1, characterized in that the bearing member (6) consist of a plain bearing of a hard, semi-crystalline thermoplastic material.

4. A damped flywheel according to claim 3, characterized in that the plain bearing is a polyetheretherketone.

5. A damped flywheel according to claim 1, characterized in that the bearing members (6) consist of a plain bearing in the form of a polytetrafluoroethylene.

6. A damped flywheel comprising first and second coaxial masses (1, 2) which are mounted for rotation of one with respect to the other against a torsion damper device (3) which includes a friction means (9) with the first mass including a central nose (4) projecting axially and penetrating into a central aperture (5) of the second mass, with support means (6) being interposed between said nose and said central aperture for the rotary mounting of the second mass, wherein the torsion damper device (3) comprises a damper plate (31) which is in contact at its inner periphery with a reaction plate (21) of the second mass (2), each of said damper plate (31) and said reaction plate (21) having a central bore (69, 5) forming the central aperture characterized in that the friction means (9) is mounted in a cavity (50) bounded at least in part by a recess of the reaction plate (21) and by the damper plate (31), and in that the support means (6, 60) are bearing members and are interposed between the central nose (4) and the central aperture, and wherein the friction means comprise at least one ring (44, 42) which meshes, with a clearance, with one of the elements consisting of the central nose (4) and the reaction plate (21), and wherein the at least one ring includes, firstly, a thrust ring (44) having, at its outer periphery, teeth (48) which penetrate into associated grooves (46) formed in the recess which is formed in the reaction plate (21), and secondly, a motion transmitting ring (42) having, at its outer periphery, teeth (49) which penetrate into associated grooves (47) formed at an outer periphery of the central nose (4), and in that friction rings (41, 43) are arranged on either side of the motion transmitting ring, while an axially acting resilient ring is interposed between the thrust ring (44) and a base of the recess in the reaction plate (21).

7. A damped flywheel comprising first and second coaxial masses (1, 2) which are mounted for rotation of one with respect to the other against a torsion damper device (3) which includes a friction means (9) with the first mass including a central nose (4) protecting axially and penetrating into a central aperture (5) of the second mass, with support means (6) being interposed between said nose and said central aperture for the rotary mounting of the second mass, wherein the torsion damper device (3) comprises a damper plate (31) which is in contact at its inner periphery with a reaction plate (21) of the second mass (2), each of said damper plate (31) and said reaction plate (21) having a central bore (69, 5) forming the central aperture characterized in that the friction means (9) is mounted in a cavity (50) bounded at least in part by a recess of the reaction plate (21) and by the damper plate (31), and in that the support means (6, 60) are bearing members and are interposed between the central nose (4) and the central aperture, and wherein the central nose (4) is tubular and has a collar portion (16), together with at least one first smooth portion and a portion having grooves for meshing with a motion transmitting ring which is part of the friction means (9).

8. A damped flywheel according to claim 7, characterized in that an outer periphery of the central nose (4) and a face of the collar portion (16) are coated with a layer of amorphous diamond carbon.

* * * * *